(No Model.)
J. H. BLESSING.
SAFETY VALVE.
No. 304,290. Patented Sept. 2, 1884.
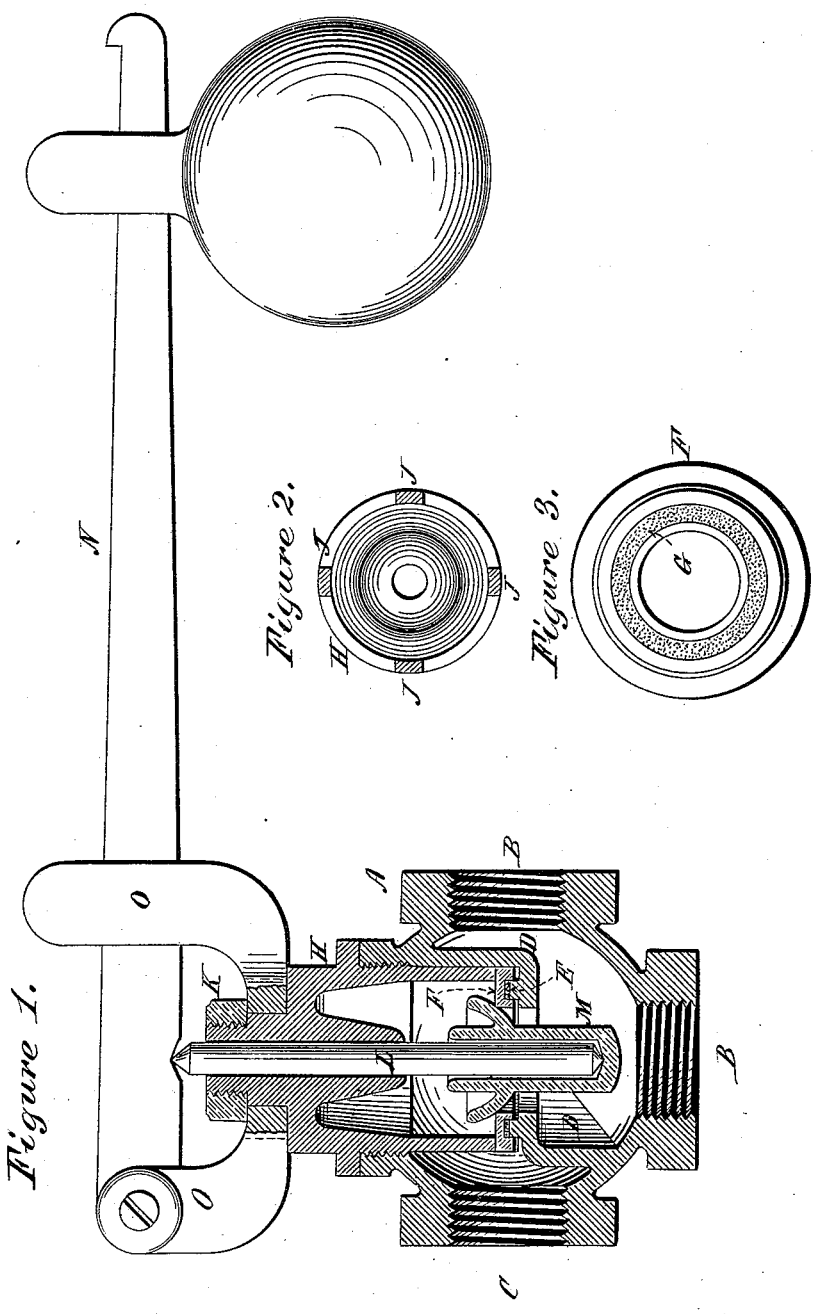

UNITED STATES PATENT OFFICE.

JAMES H. BLESSING, OF ALBANY, NEW YORK.

SAFETY-VALVE.

SPECIFICATION forming part of Letters Patent No. 304,290, dated September 2, 1884.

Application filed December 19, 1883. (No model.)

*To all whom it may concern:*

Be it known that I, JAMES H. BLESSING, of the city of Albany, county of Albany, and State of New York, have invented a new and useful Improvement in Safety-Valves, of which the following is a full, true, and exact description, reference being had to the accompanying drawings.

This invention relates to an improvement in safety-valves, and is designed to furnish a valve which will be at once tight and incapable of sticking to its seat; and it also provides in a simple and efficacious way a method of renewing the valve-seat in case it should be worn out.

My invention will be readily understood from the accompanying drawings, in which Figure 1 represents a section of my valve. Fig. 2 represents a view of the spider-frame holding the valve-seat in position, and Fig. 3 a view of the valve-seat.

A represents a view of the valve-box; B B, openings by which the steam or other fluid may be admitted to the valve M and delivery-port C; D, a diaphragm separating the openings B B from the opening C. Carried in this diaphragm is the annular valve-seat support E, upon which the valve-seat F is placed. This seat has an annular recess, G, corresponding to the lip or metallic annulus E, which is provided with a soft packing, which serves the double purpose of packing the opening between the valve-seat and its support and of lessening the impact of the valve. This valve-seat is held in its position by the spider-frame H, provided with arms J, which is screwed into the valve-box, as is clearly shown in the drawings. The upper end of this frame is provided with screw thread and nut K, and the frame itself is drilled longitudinally to allow of the free movement of the pin L.

M represents the valve, which valve has a cup or recess projecting below, and preferably to a considerable distance below, the valve-seat. The valve itself has a spherical face where it bears against the corner of the valve-seat F.

N represents the safety-valve lever, supported in the frame O in the usual manner. This frame rests upon the upper part of the spider-frame H, and is locked thereto by the nut K, previously described. The pin L rests in the cup of the valve M, while its upper end engages with the lever N. This pin is loose in the frame.

The operation of this valve can now be readily understood. In the first place, the valve-seat F, provided with cushion G, is dropped upon the diaphragm or partition. The valve M is then placed in position, and the spider-frame H is screwed down upon the valve-seat. The stem L is then dropped through the opening in said frame, and finally the lever N is adjusted by the nut K in position. When the valve is so constructed, it will be seen that the closing-surface is merely the line of contact between the square corner of the valve-seat and the spherical surface of the valve; and it will be likewise seen that the valve itself is automatically centered, by reason of the fact that the bearing of the pin L against said valve is below the bearing of the valve upon its seat; and it will also be seen that a new seat or a new valve and seat can be readily and quickly substituted for the ones in the valve should it be desired to make such substitution.

This method of mounting a valve is applicable to other kinds of valve besides safety-valves, but is especially applicable to safety-valves. It will be plain likewise that a spring might be substituted for the weight to close the valve.

What I claim as my invention, and desire to secure by Letters Patent, is—

1. A valve having a spherical surface closing against a valve-seat, and having an elongated and contracted cup, and a free rod or pin exerting its force in said valve at a point below the valve-seat, whereby the valve is automatically centered on its seat, as set forth.

2. The combination, in a safety-valve, of a valve provided with a spherical valve-surface, a valve-seat provided with an angular seating-surface, and a pin bearing against said valve below the seating-surface and free to move in said valve, and likewise against the power closing said valve, substantially as described.

3. The combination, in a safety-valve, of the valve-box A, provided with diaphragm D, the removable valve-seat F, the spherical valve, and the pin L loose therein, operated by the power closing the valve, substantially as described.

4. The combination of the valve-box A, diaphragm D, the valve M, the spider-frame H, locking the removable seat F in position, and itself supporting the frame O and lever N, and provided with an opening for the passage of the connecting-pin L, and the pin L, joining the lever N and valve M, substantially as described.

JAMES H. BLESSING.

Witnesses:
WILLIAM A. POLLOCK,
ANTHONY GREF.